US012726319B2

(12) United States Patent
Salim et al.

(10) Patent No.: US 12,726,319 B2
(45) Date of Patent: Sep. 1, 2026

(54) FEEDBACK RESOURCE DETERMINATION FROM SIDELINK SHARED CHANNEL

(71) Applicant: JRD COMMUNICATION (SHENZHEN) LTD., Shenzhen (CN)

(72) Inventors: Umer Salim, Shenzhen (CN); Bruno Jechoux, Shenzhen (CN); Virgile Garcia, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 285 days.

(21) Appl. No.: 18/765,203

(22) Filed: Jul. 5, 2024

(65) Prior Publication Data

US 2024/0364483 A1 Oct. 31, 2024

Related U.S. Application Data

(62) Division of application No. 17/605,964, filed as application No. PCT/CN2020/118268 on Sep. 28, 2020, now Pat. No. 12,081,488.

(60) Provisional application No. 62/910,027, filed on Oct. 3, 2019.

(51) Int. Cl.
*H04L 5/00* (2006.01)

(52) U.S. Cl.
CPC .................................. *H04L 5/0055* (2013.01)

(58) Field of Classification Search
USPC .......................................................... 370/329
See application file for complete search history.

(56) References Cited

U.S. PATENT DOCUMENTS 12,081,488 B2 * 9/2024 Salim .................... H04L 1/1854
2001/0019505 A1 9/2001 Polney
2017/0048847 A1 2/2017 Bertrand et al.
2019/0150157 A1 5/2019 Panteleev et al.

FOREIGN PATENT DOCUMENTS

CN 104798429 A 7/2015
CN 108400843 A 8/2018
CN 109792594 A 5/2019
CN 109891981 A 6/2019
WO 2020133504 A1 7/2020
WO 2020142940 A1 7/2020

OTHER PUBLICATIONS

International Search Report in International application No. PCT/CN2020/118268, mailed on Dec. 31, 2020.

(Continued)

*Primary Examiner* — Peter G Solinsky
(74) *Attorney, Agent, or Firm* — PV IP PC; Wei Te Chung

(57) ABSTRACT

There is provided a method of determining PSSCH feedback resources performed at a UE, wherein the PSSCH feedback (PSFCH) resource has a periodicity N defined as a number of slots. The method comprises counting a number of sub-channels, C, of PSSCH in the period N, wherein each sub-channel, c, is associated with a PSFCH resource; counting a number of PSFCH resources, R, in the period N; indexing the sub-channels, c, based on time; and after indexing the sub-channels, c, based on time, indexing the sub-channels, c, based on frequency.

2 Claims, 11 Drawing Sheets

(56) References Cited

OTHER PUBLICATIONS

Written Opinion of the International Search Authority in International application No. PCT/CN2020/118268, mailed on Dec. 31, 2020.
Huawei, et al., "Sidelink physical layer procedures for NR V2X", 3GPP TSG RAN WG1 Meeting #97, R1-1906008, 2019.
Huawei, et al., "Design and contents of PSCCH and PSFCH", 3GPP RAN WG1 Meeting #97, R1-1906596, 2019.
Huawei, et al., "Sidelink physical layer procedures for NR V2X", 3GPP TSG RAN WG1 Meeting#98, R1-1908040, 2019.
Chinese Office Action issued in corresponding Chinese Patent Application No. 202080035865.5 dated Dec. 6, 2023, pp. 1-32.
European Search Report in European application No. 25212705.5, mailed on Feb. 9, 2026.
European Search Report in European application No. 20870981.6, mailed on Apr. 8, 2022.
NPL1: R1-1908680, Physical Layer Procedures for NR V2X, Aug. 16, 2019.

* cited by examiner

FEEDBACK RESOURCE DETERMINATION FROM SIDELINK SHARED CHANNEL

CROSS REFERENCE TO RELATED APPLICATIONS

The disclosure is a continuation of U.S. patent application Ser. No. 17/605,964 filed on Oct. 22, 2021, titled "FEEDBACK RESOURCE DETERMINATION FROM SIDELINK SHARED CHANNEL", which is a US national phase application based upon an International Application No. PCT/CN2020/118268, filed on Sep. 28, 2020, titled "FEEDBACK RESOURCE DETERMINATION FROM SIDELINK SHARED CHANNEL", which claims priority to U.S. provisional Application No. 62/910,027, filed on Oct. 3, 2019, which is incorporated by reference in the present application in its entirety.

BACKGROUND OF DISCLOSURE

Technical Field

The following disclosure relates to feedback resource determination from sidelink shared channel. More particularly, but not exclusively, to methods for implicit feedback resource determination from the sidelink shared channel for HARQ enabled unicast and groupcast transmissions.

Background

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of 10-5 or 10-6 has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There are provided methods for implicit determination of feedback resource at a UE that is scheduled for HARQ enabled sidelink transmission. In some methods, a relation may be used which maps the fully general sidelink shared channel resource to fully general sidelink feedback channel resource. The methods disclosed may be used in groupcast feedback Option 1 (NACK only feedback) and groupcast feedback Option 2 (ACK and NACK based feedback). NACK only feedback is proposed to handle verbatim to the unicast feedback case. All sidelink Rx(s) in a group may use the same single feedback resource with a single sequence. For the case of ACK and NACK based feedback in groupcast, a dedicated subset of resources may be allocated in the overall feedback resource. This may be dimensioned appropriately in the pre-configuration.

Implicit feedback determination may lead to conflict cases when a given sidelink device transmits multiple feedbacks, receives multiple feedback, or transmits and receives simultaneously in a given feedback interval. Some methods are disclosed for handling such conflicts. For example, multiple transmissions between a single pair of sidelink Tx and Rx may be fed back in a single feedback interval, and in some aspects of the disclosure multiple feedbacks when the feedback resources implicitly assigned may be orthogonal in time and/or frequency. When the implicitly assigned resources occur over a single time-frequency resource, a pre-configured mapping may allow a sidelink Rx to perform the transmission of a single sequence (Phase shift) which provides the multiplexed feedback to the sidelink Tx for all relevant transmissions without any additional signalling.

An advantage of the disclosed methods include that implicit feedback resource determination is enabled for any feedback periodicity and is applicable for any shared channel to feedback delay value, both of which play a fundamental role in feedback resource assignment.

There is provided a non-transitory computer-readable medium comprising instructions which, when executed by a computer, cause the computer to carry out the steps of the methods. The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF EMBODIMENTS

Those skilled in the art will recognise and appreciate that the specifics of the examples described are merely illustrative of some embodiments and that the teachings set forth herein are applicable in a variety of alternative settings.

Figure 1:
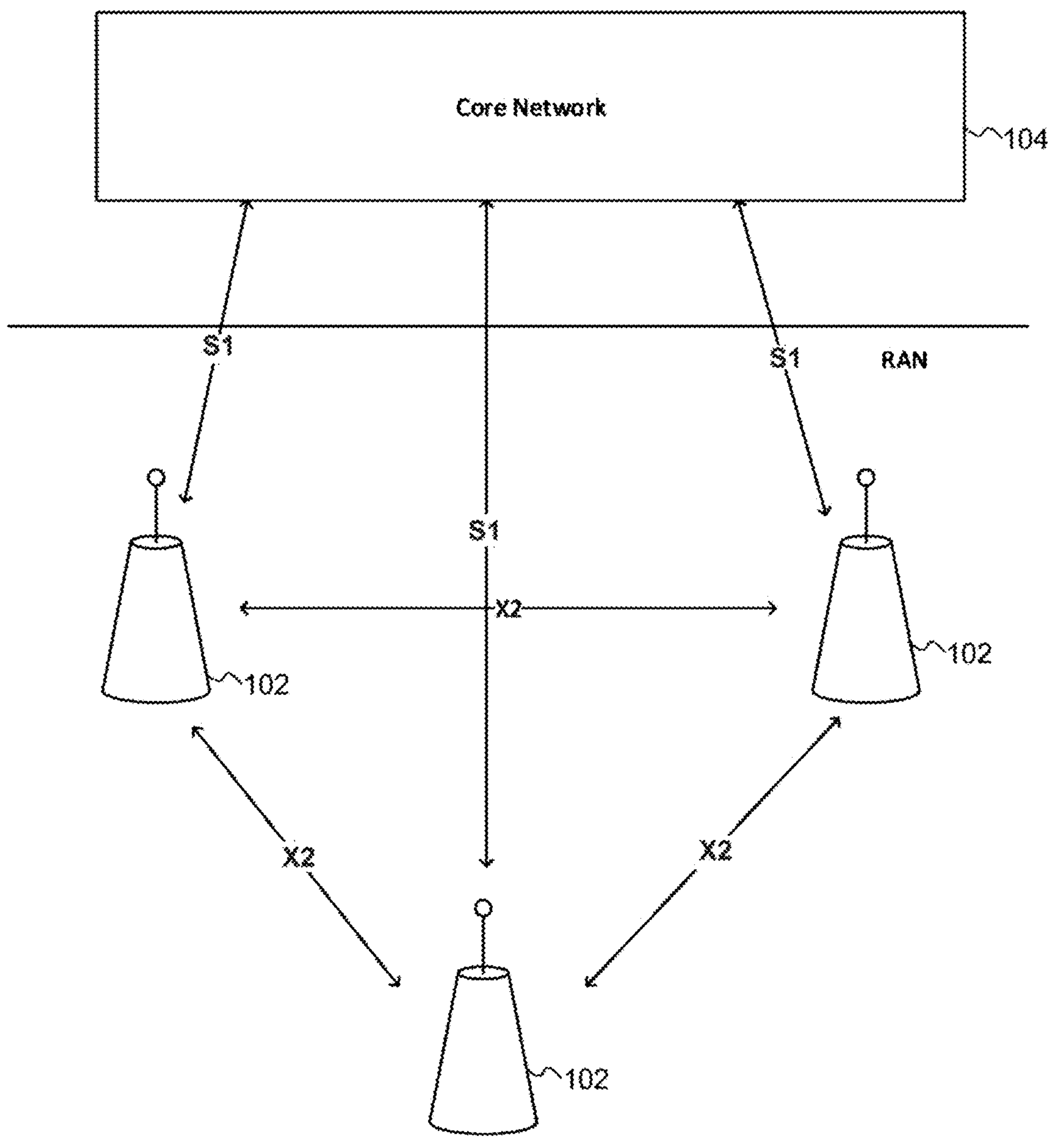
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the Si interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
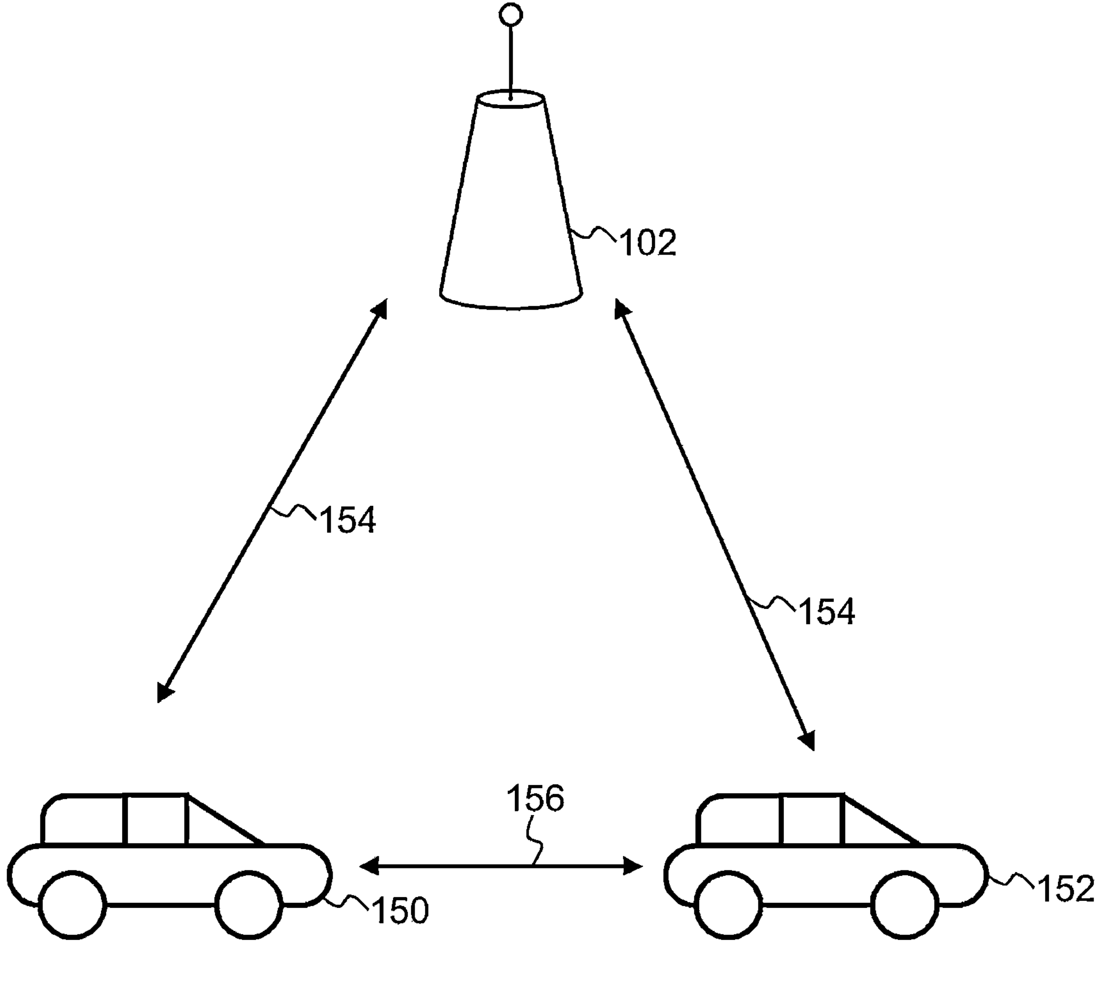
FIG. 2 shows selected elements in a Radio Area Network of the cellular wireless communication network of FIG. 1.

FIG. 2 illustrates a base station 102 forming a RAN, and a transmitter (Tx) UE 150 and a receiver (Rx) UE 152 in the RAN. The base station 102 is arranged to wirelessly communicate over respective connections 154 with each of the Tx UE 150 and the Rx UE 152. The Tx UE 150 and the Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (e.g. eNBs or gNBs). All the scheduling and the resource assignments may be made by the base stations.

Mode 2 applies when the V2X services operate out-of-coverage of cellular base stations. Here the UEs need to schedule themselves. For fair utilization, sensing-based resource allocation is generally adopted at the UEs. In Mode 2, UEs reserve resources for a transmission by transmitting a Sidelink Control Information (SCI) message indicating the resources to be used. The SCI notifies the recipient (which may be a single UE in unicast, a group of UEs in groupcast, or all reachable UEs in broadcast) of the details of the transmission it can expect. UEs may reserve transmission resources both for a first transmission of a Transport Block (TB) of data, and also for transmitting repetitions of the TB to improve reliability if the initial transmission fails.

In typical data transmission with Hybrid automatic repeat request (HARQ), a transmitter UE will send data, i.e. a TB, to a receiver UE. Upon receiving the data, the receiver UE sends, to the transmitter UE, an acknowledgement (ACK) or negative acknowledgement (NACK) indicating the status of the data reception. If the transmitter UE receives a NACK for the TB, the transmitter UE makes a re-transmission of the transport block if the maximum number of re-transmissions, if configured, has not reached.

When sidelink HARQ feedback is enabled for groupcast, two options are supported: [0041] Option 1: A receiver UE transmits HARQ-NACK on a Physical Sidelink Feedback Channel (PSFCH) if it fails to decode the corresponding TB after decoding the associated Physical Sidelink Control Channel (PSCCH). It transmits no signal on PSFCH otherwise. [0042] Option 2: A receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.

This disclosure provides methods for determining feedback resources from a shared channel carrying sidelink transmissions.

In an aspect of the disclosure, there is provided a scheme to determine the sidelink feedback resource from the sidelink shared channel (PSSCH) carrying the transmission by retaining the granularity of feedback channel on a per sub-channel basis.

In an example mapping, the first sub-channel in the first slot of the sidelink transmission may be mapped to the first sub-channel PSFCH resource. Thus, there is 1:1 mapping between all the sub-channels of the PSSCH to the PSFCH resources, which are also on the granularity of the sub-channel. Although the PSFCH resource for a given sub-channel starts at the same Physical Resource Block (PRB) which is the starting PRB for the sub-channel, the number of PRBs for each feedback resource can be smaller than the sub-channel size. In this case, some of the PRBs may left unused between each consecutive PSFCH resource. The size of one PSFCH resource can be part of the resource pool configuration, and it can be configured to be 1, 2 or 4 PRBs as possible configurations.

This scheme may result in feedback resource assignment such that all the PSSCH sub-channels in one slot may have feedback resources which are multiplexed in frequency. As the periodicity of feedback resource in the resource pool can be larger than 1, every 2 or 4 slots for example, multiple slots may need to be accommodated in the PSFCH resource. The same sub-channel in multiple slots may use the same time-frequency PSFCH resource but may be identifiable by CDM sequences. Thus, each PSSCH slot may be associated with a different CDM sequence. For a Physical Uplink Control Channel (PUCCH) format 0 based design, this may result in transmission of orthogonal sequences on the same time-frequency resource from the shared channel transmission over a given sub-channel in consecutive slots.

One example configuration is to map the first slot of the PSFCH interval with the first CDM sequence, 2nd slot with the second CDM sequence and so on.

The slot delay from PSSCH to PSFCH dictates which phase shift sequence may be transmitted. This may not always be the "K" value which is the delay indicated to be between PSSCH and PSFCH. This is because unless each slot carries PSFCH resource, multiple slots may be mapped to a single sidelink feedback resource, thus resulting in an effective delay value between PSSCH to PSFCH resource which can be different from K. Precisely speaking, this value may be equal or larger than "K" value.

Figure 3:
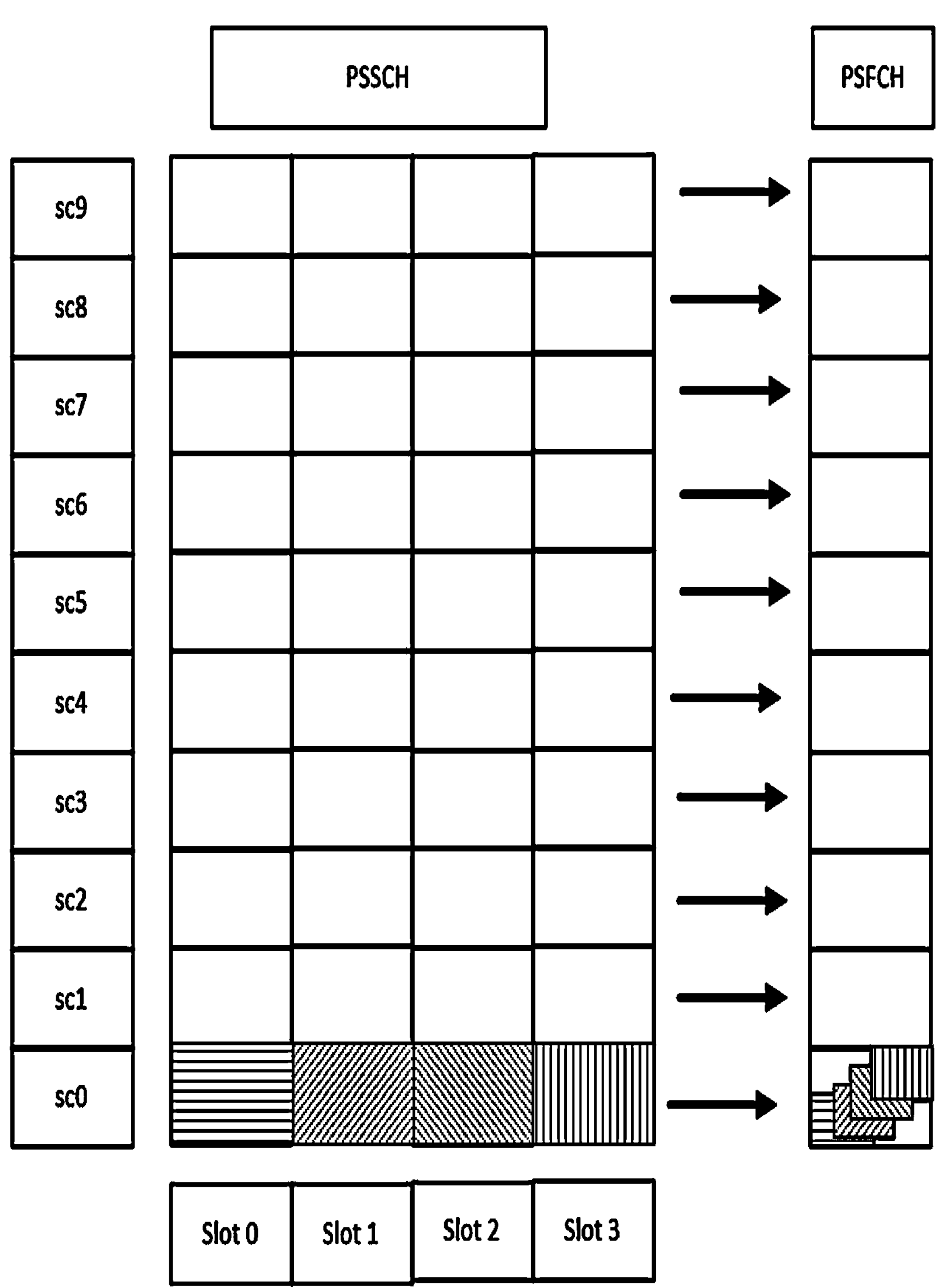
FIG. 3 shows sub-channel based PSFCH assignment with CDM over multiple slots.

FIG. 3 shows an example setting where the resource pool is configured such that it comprises of 10 sub-channels (sc), denoted from sc0 to sc9, and the periodic feedback resource occurs every 4 slots. The sub-channel 0 of the PSSCH, for all the slots within the feedback interval, uses the sub-channel 0 of the PSFCH resources. FIG. 3 shows the four slots of PSSCH which are mapped to a given feedback interval. Although FIG. 3 shows the PSFCH resources separately from the PSSCH, this is for ease of illustration only. In reality, the PSFCH resources are present in the same resource pool every "N" slots, where N may be configured to be 1, 2 or 4 slots. The PSFCH resource may be configured to comprise of variable number of symbols in time domain.

Figures 4, 5:
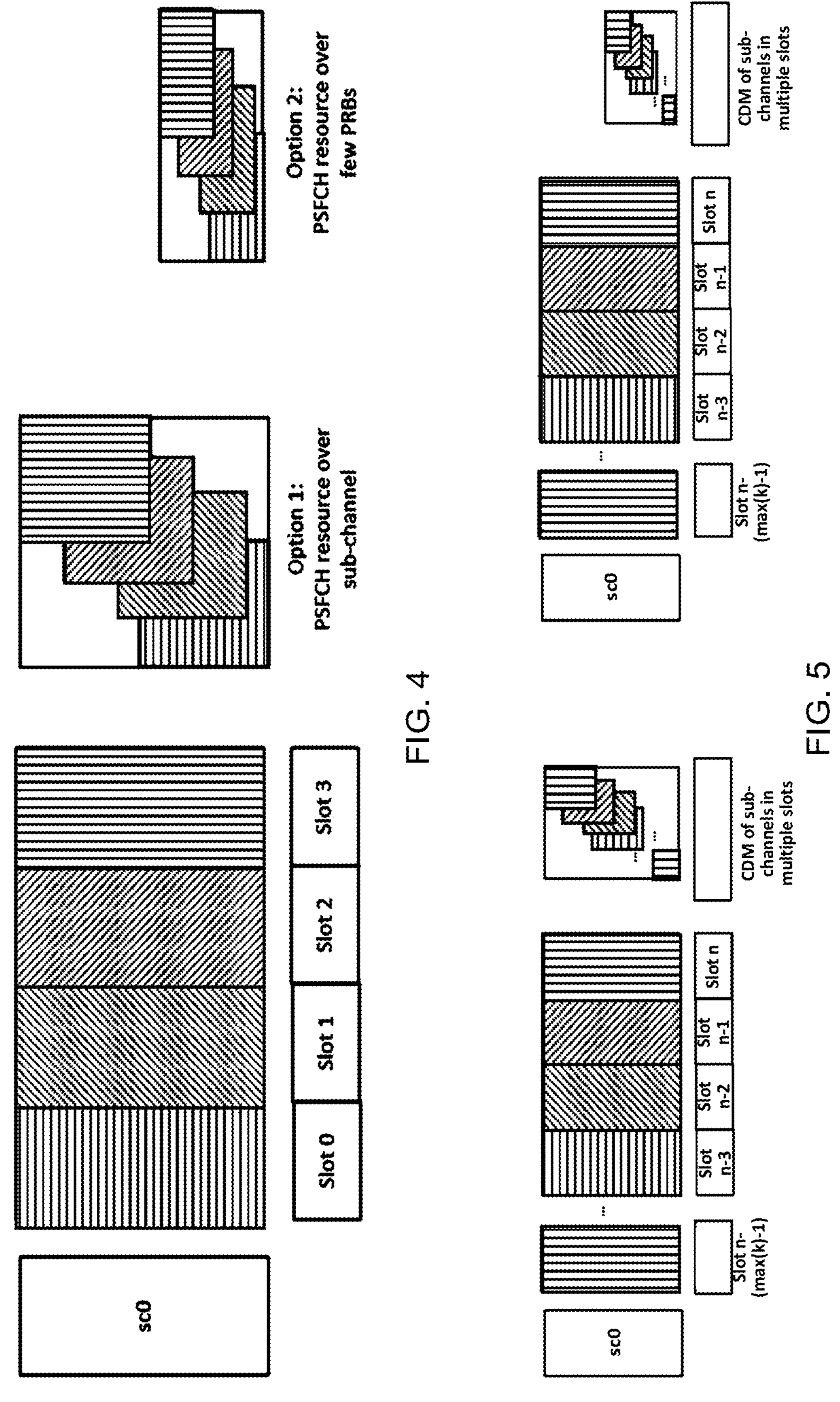
FIG. 4 shows a detailed view of the first sub-channel (sc0) of FIG. 3.
FIG. 5 shows multiple K values in a configuration.

FIG. 4 shows a detailed view of the example of sub-channel 0 (sc0) from FIG. 3. In FIG. 4, different PSSCH slots are Code Division Multiplexed in the same PSFCH resource. FIG. 4 shows two possibilities: Option 1 and Option 2. In Option 1, each PSFCH resource occupies the PRBs of one sub-channel. In Option 2, each PSFCH comprises only a portion of sub-channel PRBs. Thus, for Option 2, a PSFCH resource is configured to occupy "Pn" number of PRBs, where Pn is a feedback configuration parameter and part of resource pool configuration. Option 2 is similar to Option 1, but the PSFCH resources is a group Pn of configurable number of PRBs. The sub-channels in a slot are 1:1 mapped to the PSFCH resource, and the same sub-channel number from different slots is Code Division Multiplexed.

One variation may be to introduce an offset from a first sub-channel to a first PSFCH resource, which is unique for each slot. This may be helpful by having a user equipment feeding back on different PSFCH time-frequency resources when it is scheduled in consecutive slots over the same sub-channel.

In an aspect of the disclosure, UEs may be configured with a shared channel to feedback delay as a function of application requirements and UE capabilities, which may vary widely among the UEs.

If the PSFCH resources are dimensioned for the worst-case delay, this may require provisioning a large amount of feedback resources. Given that all the transmissions may not be HARQ enabled, this could make for very poor utilization of PSFCH resources. Further, if PSFCH resources are uniformly distributed without an intelligent mapping, a fraction of PSFCH resources will be actively used and a significant portion, corresponding to delay values not active, will be wasted.

To handle such difficulties arising with a wide range of K values, one option may be to restrict the parametrization of same delay parameter K for all the transmission in a resource pool. Thus, the base station configures the same value of delay parameter for all the UEs for a given pool. In this case, the delay value can be specified as part of the resource pool configuration. UEs may generally be configured to ignore PSSCH specific delay values in case a resource pool specific value is specified. This will then ensure that each occurrence of PSFCH resource will have feedback from no more than N slots, where N is the periodicity of the feedback resource. This may simplify the shared channel to feedback channel mapping design but this condition on forcing the same PS SCH-to-PSFCH delay is very restrictive. This delay value is suitably selected primarily for the user equipment ability to process data and to satisfy the Quality of service (QoS) requirements of the sidelink application. The limitation to choose a single value may result in resource pool operation for the worst-case user capability in the resource pool and may compromise the QoS targets for many sidelink applications.

An alternative method is to allow multiple K values in operation in a given resource pool. Feedback determination can use CDM from the previous slots, using the same sub-channel approach. Thus, each sub-channel is mapped to a given time-frequency PSFCH resource. The delay value governs which CDM sequence will be transmitted by the sidelink Rx. Thus, the delays which can be handled by this approach are limited by the CDM capability of one time-frequency PSFCH resource. PUCCH format 0 can handle up to 12 orthogonal sequences. This implies that up to 6 transmissions can be scheduled for ACK and NACK, by having two phase shifts (or sequences) assigned for each single transmission. If the sidelink feedback uses the same design as PUCCH format 0, up to 12/2=6 slots feedback delay can be handled in the CDM sequences for a given time frequency PSFCH resource. For this arrangement, an "effective delay value" may be used, rather than "K". This is denoted by a different parameter, called K_eff. This "effective K" may be defined as the number of slots occurring between the PSSCH and PSFCH where feedback is being reported. The number of slots can be logical or physical. The choice may depend how it is adopted for K. Independent of if K operates on logical or physical slots, the technique proposed here allows successful operation by proper usage of K_eff. The suitable choice to determine the PSFCH resource is to keep K_eff logical, independent of if K is taken to be physical or logical. Furthermore, as discussed earlier, K_eff is the effective number of logical slots from shared channel (i.e. PSSCH) to feedback channel (i.e. PSFCH). This has the benefit that if there are certain non-sidelink slots for the case of shared carrier, useful feedback resources are not consumed.

Using the delay between the PSSCH and PSFCH, UEs can have different K configurations matching their capabilities and requirements, offering more flexibility.

In the case where K may be different for different UEs within a given resource pool (RP) configuration and PSFCH resource configuration, the total number of slots reported in a given PSFCH occasion may not be constant. Furthermore, the K configuration of other UEs may not necessarily be known by each user. In fact, the (maximum) total number of slots to be reported in a given PSFCH occasion increases for large spread in different K values in use and it is the periodicity N plus the (max) range of value for K: N+range (K)=N+max(K)−min(K). Using the proposed scheme, each of the slots that may be reported is allocated a CDM code corresponding to its effective K, thus avoiding conflicts between different K configurations.

Although the K configuration of each user is not needed to be known by others in this proposal, the min(K) value can be indicated in the RP configuration, so that UEs can apply an offset to the starting slot for counting the CDM and time-frequency (T-F) resource allocation to avoid wasting PSFCH resources: the min(K) slots just before the PSFCH may not be counted and thus have PSFCH resource assignments in the subsequent feedback interval after the nearest feedback interval.

In case a transmission has a larger delay (of K_eff) than the maximum number of codes, two options are proposed, which can be set in the RP configuration: either the receiver skips the feedback if its transmission has an effective delay (K_eff) larger than a pre-configured threshold, or a cyclic allocation can be performed (e.g. using modulo operation) to allow a feedback with the risk of collision (which may be handled by the scheduling entity).

FIG. 5 shows that delay values exceeding the feedback interval periodicity can be incorporated easily into implicit feedback resource determination, thus facilitating a wide variety of QoS provisioning in a given resource pool.

Figure 6:
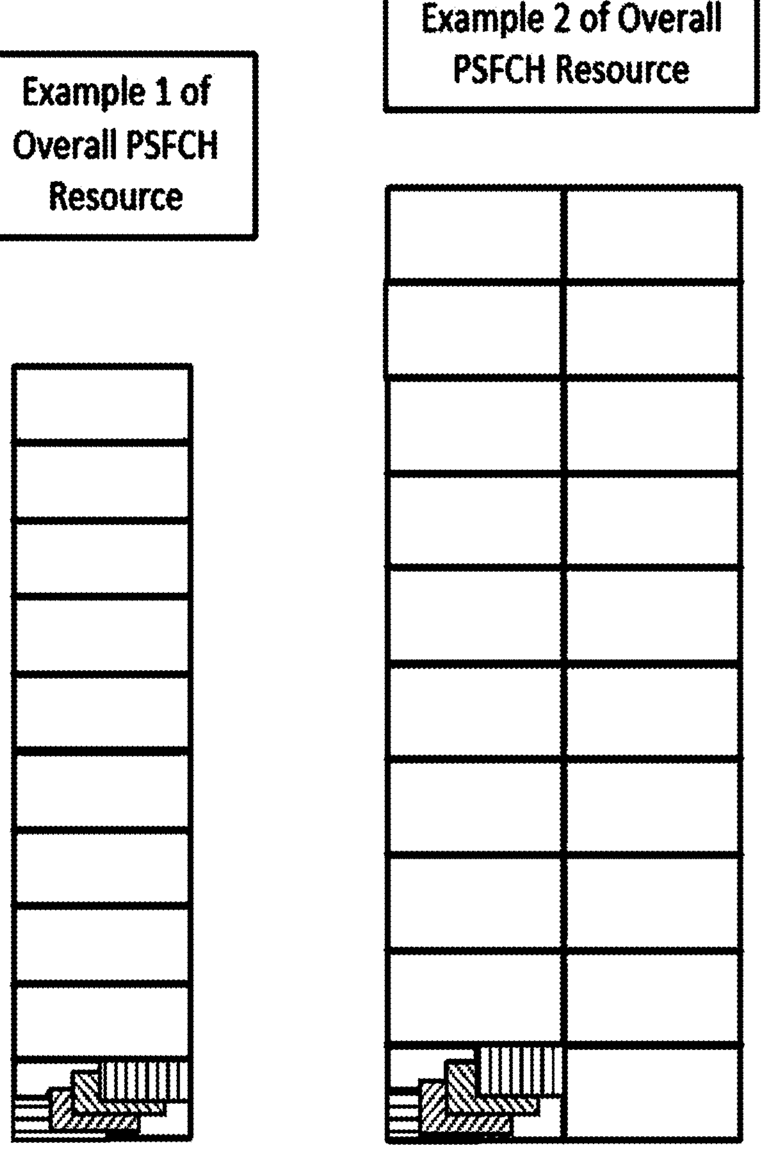
FIG. 6 shows TDM PSFCH resource for a feedback occurrence.

In a fully general configuration of sidelink resource pool, the size of the sub-channel may be configurable for the sidelink PSSCH. The PSFCH resource occurrence has a given periodicity N, the number of PRBs and Orthogonal frequency-division multiplexing (OFDM) symbols in one PSFCH resource is configurable. Furthermore, the feedback occurrence event N slots may comprise of one or multiple Time-division multiplexing (TDM) PSFCH resources. Many conflicting cases where a single Tx or Rx may need to transmit or receive multiple feedbacks may benefit if the feedback resource comprises of multiple TDM PSFCH resources. This is shown in Example 2 of FIG. 6 which shows that the feedback interval comprises of two sets of TDM PSFCH resources.

In an aspect of the disclosure, to accommodate the implicit mapping in its full generality, a relation may be used which maps the fully general sidelink PSSCH resource to a fully general sidelink feedback channel resource.

The approach comprises counting all the sub-channels of PSSCH in N slots, where N is the periodicity of PSFCH occurrence. Suppose that there are in total C sub-channels in this period. Same as for PSSCH sub-channels, all the time-frequency resources of PSFCH are counted. Here at this step, the CDM resources in each PSFCH resource are ignored. Suppose that there are R PSFCH resources in total which are orthogonal in time or frequency or both time and frequency. As time-frequency orthogonality is superior to CDM orthogonality, the main feature of the scheme is to prioritize the utilization of time-frequency orthogonal PSFCH resources prior to doing the CDM over the PSFCH resources. Thus, the first sub-channel of the PSSCH is mapped to the first time-frequency resource of the PSFCH. The next sub-channel is mapped to the next PSFCH resource, orthogonal in frequency. When the frequency dimension for PSFCH resources has been exhausted, the PSFCH resources in the next time dimension (in case the PSFCH occurrence carriers more than one TDM PSFCH resources) are allocated. This goes on until all the time or frequency orthogonal PSFCH resources have been associated. This associates first R sub-channels to the R PSFCH time-frequency orthogonal resources. If there are still more sub-channels, the next sub-channel uses the first PSFCH resource doing CDM using the second phase shift (cyclically shifted sequence of the same base sequence). The second sequence will correspond to a different phase shift compared to the one allocated for the first user. Thus, next R sub-channels use the second CDM sequence over the R time-frequency orthogonal PSFCH resources. This will go on unless all the sub-channels have been associated to a given feedback resource. The order in which different phase shifts (or cyclically shifted sequences) are used can be selected so as to keep the maximum distance between the first round of PSFCH resource allocation and the second round of PSFCH resource allocation, and so on.

Using the time or frequency orthogonal PSFCH resources first leads to feedback resource determination and utilization with more balanced number of feedbacks on the average per feedback time-frequency resource. If CDM is prioritized over FDM/TDM of PSFCH resources, this may result in some PSFCH resources using all the CDM sequences and some others with smaller number of CDM sequences or no sequence at all. A balanced loading of PSFCH time-frequency resources is beneficial for automatic gain control and to reduce the interference/emissions on the neighbouring resources. Prioritizing first the orthogonal time-frequency resources for feedback of different transmissions has the benefit that it avoids the near-far effect of CDM approach. This problem occurs when two UEs will transmit feedback over the same time-frequency resource in a CDM manner with a different transmit power. In such a case, the detection of low power UEs suffer due to the transmission from high power UEs.

Figure 7:
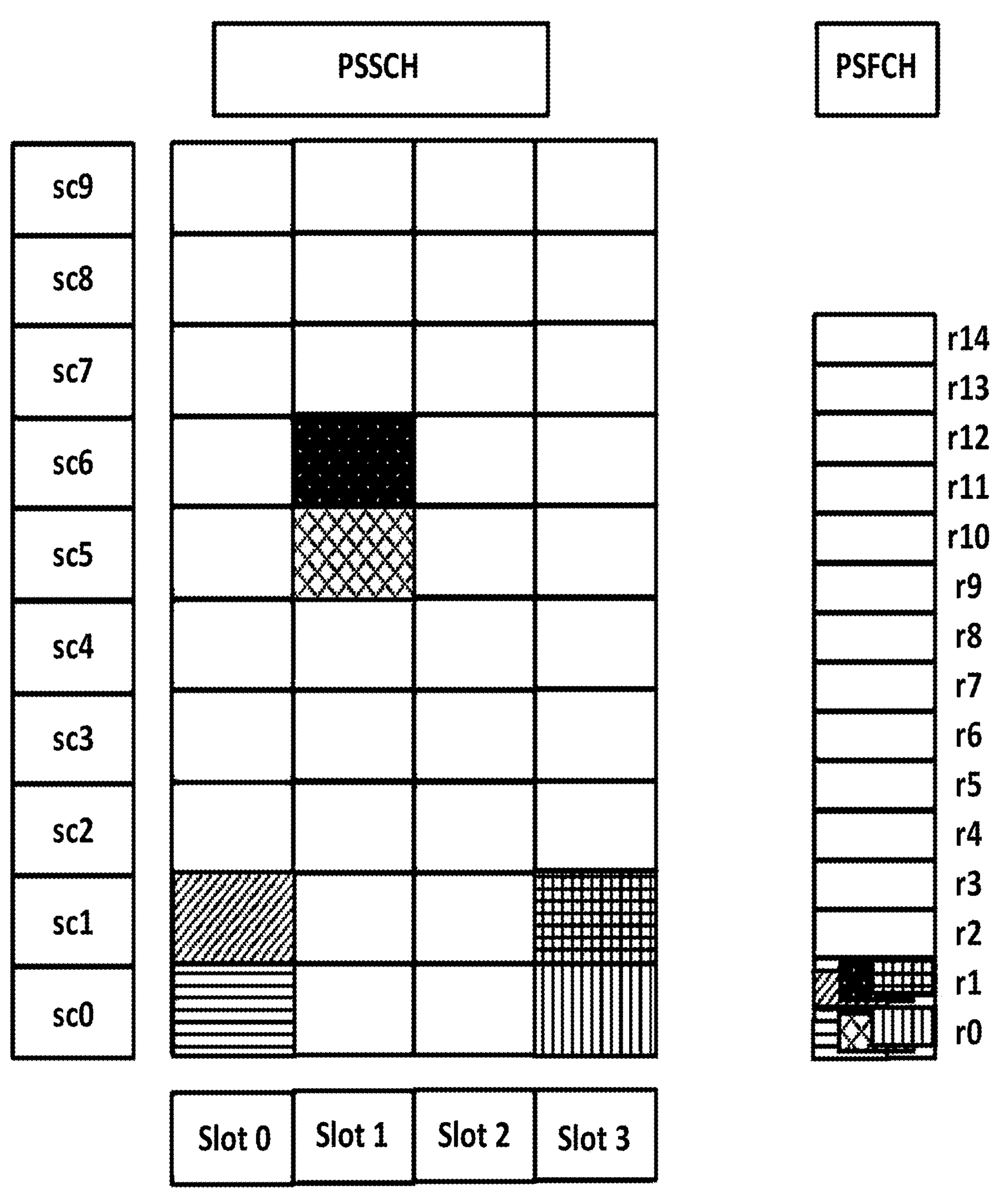
FIG. 7 shows generalized PSSCH to PSFCH mapping.

FIG. 7 shows a general scheme for the implicit mapping of sidelink shared channel to sidelink feedback channel. FIG. 7 shows a scheme having ten sub-channels in each slot, the PSFCH resource occurs every forth slot and the feedback resource is configured for time and frequency such that there are 15 time-frequency orthogonal resources. For the purpose of illustration, only two sub-channels show the relation from PSSCH to PSFCH resource but it is to be understood that all sub-channels may have a relation from PSSCH to PSFCH resource.

Sub-channel 0 and 1 from slot #0 are mapped to PSFCH resource 0 and 1. Thus, in the example of FIG. 7, up to 15 first sub-channels use the time-frequency orthogonal PSFCH resources using the first phase shift (or cyclic sequence). Then 15th and 16th sub-channel (sub-channel 5 and 6 in slot #1) re-use the same time frequency resource as the sub-channel 0 and 1 in the first slot, but with a different phase shift (cyclic sequence). The 30th and 31st sub-channels (sub-channel 0 and 1 in slot #3) re-use yet again the same time frequency as the sub-channels 0 and 1 in the first slot but again with a different phase shift (cyclic shifted sequence) compared to the first two rounds of feedback resource determination. Thus PSFCH resource r0 is used as the feedback resource for sub-channel #0 (sub-channel 0 in slot #0), sub-channel #15 (sub-channel 5 in slot #1) and sub-channel #30 (sub-channel 0 in slot #3). Mathematically this association can be achieved and may be defined by the following relations:

PSFCH T-F resource for PSSCH sub-channel number c=c modulo-division R

PSFCH Phase-shift (CDM) sequence for sub-channel c=c integer-division R

These relations map each sub-channel, which is the scheduling granularity for the PSSCH to a given feedback resource. An offset can be introduced in the PSFCH resource determination in the above relations. This offset can be different for T-F determination and phase shift (cyclic shifted sequence determination). Further this can be configured to be a function of PSSCH slot or feedback resource slot.

Many transmissions may be scheduled to comprise multiple sub-channels. In this case, a reference sub-channel can be used to implicitly determine the PSFCH resource for this transmission. The reference sub-channel can be taken to be the lowest numbered sub-channel of the shared channel transmission. The scheme is applicable though to determine feedback resource implicitly for any choice of reference sub-channel used to determine the feedback resource as long as sidelink Tx and sidelink Rx have the same understanding of reference sub-channel for a given sidelink transmission.

For the feedback of a shared channel transmission, for sequence-based transmission, two PUCCH phase shifts (frequency domain) or two cyclically shifted sequences (time domain) may be needed per transmission to convey ACK and NACK. The relations above provide one sequence, which provides one phase shift in frequency domain. The other sequence can be taken to be one which corresponds to the phase shift farthest from the phase shift of the first determined sequence. Thus, on a unit circle, the other phase shift will be taken to be 180 degrees (or pi radians) from the first phase shift. This other phase shift then provides precisely the second CDM sequence to be used in pair with the first sequence obtained from the above relations. The two phase shifts may be used to provide ACK or NACK for a PSSCH transmission. In another method, the association of two phase shifts can be pre-defined in any suitable manner. The indexing of c is taken using a frequency-first approach, then slot (time). For example, in FIG. 7, the PSSCH resource using (sc5, slot1) corresponds to c=1*num_subchannel+5=15. This is reported in the T-F resource number 16 mod 15=1 and using the second code number. The indexing of c can alternatively be based on time first and sub_channel second. In the case of fixed K value, all UEs may have a common reference point. The indexing is used may be indicated in the resource pool configuration.

An alternative approach is to count the time dimension for PSSCH sub-channels in a backward manner from the last slot of PSSCH which gets mapped over a given PSFC resource. This way, the PSSCH resources are counted by their delay between PSSCH and PSFCH. A benefit of this approach is realized when multiple PSSCH-to-PSFCH delay values are operational in a given resource pool.

In the case where UEs have different K values, the total reportable number of slots is N+max(K)−min(K). This will then increase the total number of PSSCH transmissions (sub-channels C) to be the number of sub-channels in a reference slot multiplied by the number of reportable slots. A similar approach as discussed above can then apply in this case, using the T-F resource allocation first and CDM code second.

A difference with the discussion above is that in this multiple K values scenario, the indexing of the PSSCH resource may be done backward in time (i.e. counting the delay between PSSCH and PSFCH, logically or physically), as the different UEs do not have a common window of reporting.

Figure 8:
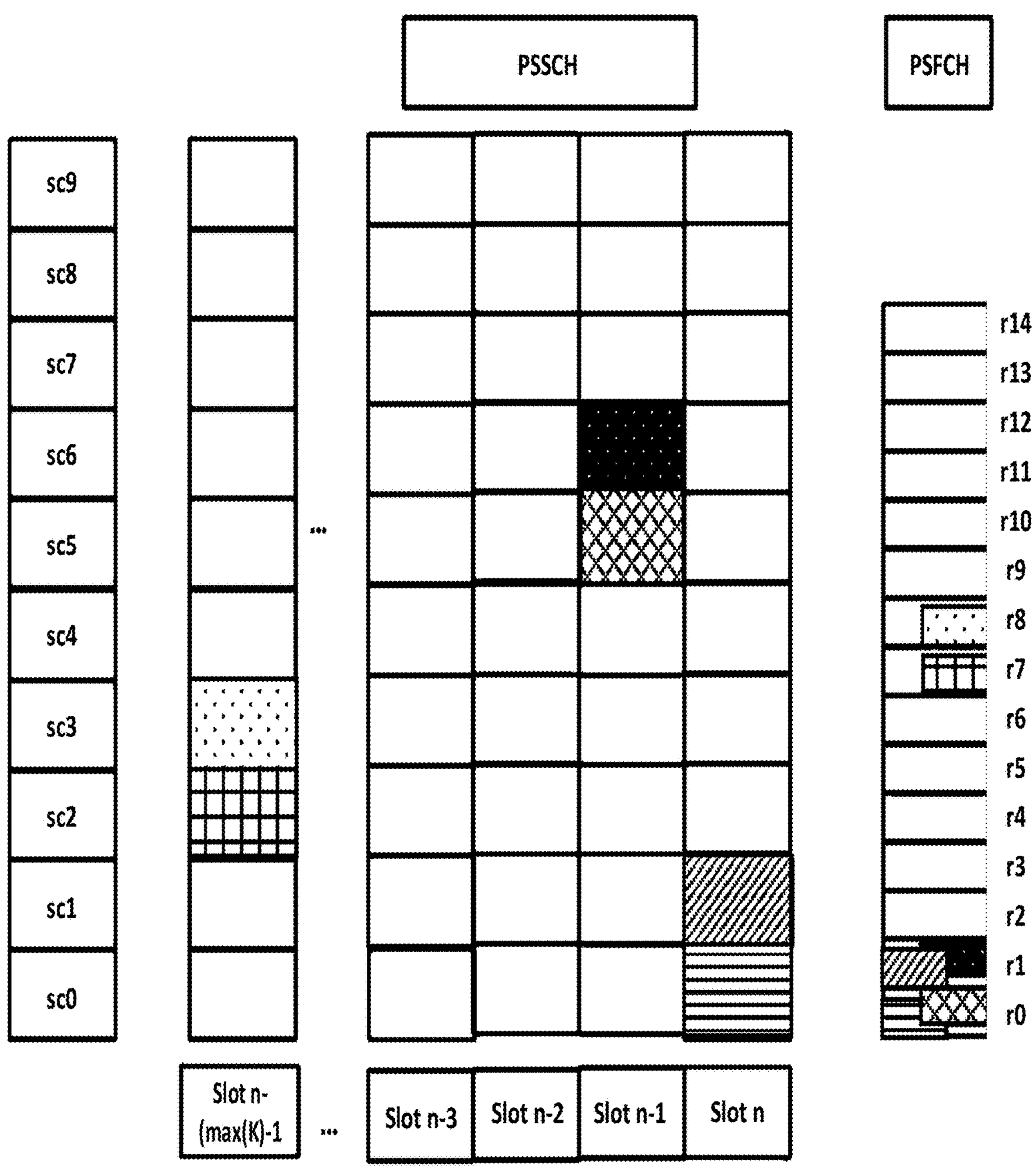
FIG. 8 shows generalized PSSCH to PSFCH mapping with wide range of K values.

With reference to FIG. 8, an example is discussed in which a max(K)=6 and n includes the min(K) offset, counting backward in time and indexing with frequency-first. The resources used for (sc2, slot n-5) are reported to T-F resource (5*num_channel+2)mod 15=7, while using the forth CDM code number. Counting the sub-channels from the slot nearest to the PSFCH period and then going to larger delays has the advantage that the sub-channels near the PSFCH resource will get priority in getting the feedback resource which is orthogonal in time and frequency. This scheme may allow better handling for cases when for example, there are no transmissions for K=5, this will lead to an empty CDM sequence, which is more acceptable than having some PSFCH resources using all the CDM sequences and other PSFCH time frequency resources where no feedback is allocated at all.

Taking an example in which there are C sub-channels of PSSCH in the PSFCH period, and R PSFCH resources in each occurrence of PSFCH period. The phase shifted sequence may be associated with the effective delay value K for each sidelink transmission:

PSFCH T-F resource for PSSCH sub-channel c=c modulo-division R

PSFCH Phase-shift (CDM) sequence for sub-channel c=Effective Delay from the PSSCH to PSFCH Feedback Resource Slot Inverted counting of sub-channels, starting near the PSFCH resource, to prioritize the time-frequency first utilization of resources over the CDM resources may be used as explained previously.

Implicit feedback mapping may give rise to some special conflict cases with respect to dual PSFCH transmission and/or dual PSFCH reception etc. These cases may result due from: a sidelink Tx transmitting multiple transmissions which may be mapped in the same PSFCH period for feedback; and/or a sidelink Rx receiving multiple transmissions for which it may need to transmit feedback in a given sidelink feedback interval.

One case which may occur is when a sidelink Tx transmits more than one transmission to a given sidelink Rx and the implicit mapping with the delay values leads to a situation such that the feedback should be within a given PSFCH period.

In an aspect of the disclosure, when multiple transmissions are mapped to the feedback resource in the same interval on PSFCH resources which are orthogonal either in time or frequency, the feedback may be transmitted individually for multiple transmissions. For power saving reasons at the sidelink Rx (that transmits feedback) and ease of reception at the sidelink Tx (that receives feedback), it may be advantageous to combine the feedback for these multiple transmissions. The combining may be performed either in the form of feedback bundling or in the form of feedback multiplexing.

If bundling is performed, even one erroneous transmission would lead to NACK for all the transmissions fed back jointly, and thus the re-transmissions for all would occur, leading to poor use of resource and spectral efficiency. If multiplexing is performed for the feedback of multiple transmissions, this may require the design of implicit mapping such that each UE is assigned more CDM sequences or phase shifts. As the implicit design is agnostic to which sidelink Rx may need multiplexing of feedback on which resources, the multiplexing resources (more CDM sequences) may need to be kept for each shared channel (PSSCH) transmission. This may lead to significant reduction in the capacity as to how many shared channel transmissions can be fed back for a given amount of PSFCH resource.

Accordingly, in an aspect of the disclosure, when there are more than one transmissions from a sidelink Tx to a sidelink Rx, and the implicit mapping leads to feedback resource assignment in the same feedback interval over the resources which are either orthogonal in time or frequency or both, the sidelink Rx may individually transmits all such feedback. A limit may be defined for how many individual feedbacks may be transmitted to ease transmit and receive processing.

In some cases, multiple sidelink transmissions between a pair of sidelink Tx and Rx may be scheduled on the overlapping time-frequency resource. This overlap of time and frequency may be complete overlap depending upon the exact design of PSFCH resource, and in this case, the sidelink Rx receives two CDM sequences to be transmitted over the same time-frequency resource. As transmission over the same time-frequency resource may limit the transmission power for the sidelink Rx sending feedback, it may degrade the reception quality for the feedback at the sidelink Tx. As discussed above, feedback combining for multiple transmissions may be carried out. Combining may be performed either in the form of feedback bundling or in the form of feedback multiplexing. The options of bundling or multiplexing may be the part of PSFCH configuration, configured as part of resource pool configuration. In the case at hand where the Rx UE is allocated two sequences for the two transmissions (or n sequences for n transmissions) over the same time-frequency resource, feedback multiplexing may be preferable and can be performed by combining the two CDM sequences which are result of implicit feedback mapping. As the transmissions are between the same pair of Tx and Rx, no additional signalling is needed, as both sides know that in this case that feedback multiplexing will be performed.

Therefore, if the implicit design leads to the following configuration between a Tx and an Rx, the sequence representing a phase shift corresponding to normal feedback may be as set out in Table 1.

TABLE-US-00001 TABLE 1 Sequence (represents Normal a given Phase Shift) Feedback Seq 1 TB0 ACK Seq 2 TB0 NACK Seq 3 TB1 ACK Seq 4 TB1 NACK In case, transport block (TB) 0 and TB1 in the Table 1 are transmitted between a single pair, the sidelink Tx and Rx may not use the above mapping.

The sidelink Rx may perform multiplexing by transmitting only a single sequence instead. The sequences or phase shifts of feedback resulting from the two transmissions are used in a composite manner. An example mapping is shown in Table 2.

TABLE-US-00002 TABLE 2 Sequence (represents Multiplexed a given Phase Shift) Feedback Seq 1 TB0 ACK and TB1 ACK Seq 2 TB0 ACK and TB1 NACK Seq 3 TB0 NACK and TB1 ACK Seq 4 TB0 NACK and TB1 NACK This mapping may allow the transmission of a single sequence. Accordingly, transmission power may not need to be reduced or shared. Both sidelink Tx and sidelink Rx understand the individual status for each transmission from the composite multiplexed mapping.

Such multiplexed feedback mappings can be pre-defined in the specification for two, three or more feedbacks which allow feedback multiplexing.

In an aspect of the disclosure, when there is more than one transmission from a sidelink Tx to a sidelink Rx, and the implicit mapping leads to PSFCH resource assignment in the same feedback interval over the same time-frequency resource with different CDM sequences, the feedback multiplexing may be performed for such transmissions by sidelink Rx transmitting only a single sequence (Phase shift) which conveys the individual feedback for all the relevant sidelink transmissions. The mapping for multiplexed feedback may be part of the pre-configuration and can be defined in the specification.

In an aspect of the disclosure, when there is more than one transmission from a sidelink Tx to a sidelink Rx, and the implicit mapping leads to feedback resource assignment in the same feedback interval, independent of if the implicitly determined feedback resources are orthogonal in any way or not, the sidelink Rx may perform feedback multiplexing. Implicit feedback determined for a TB may provide the resources (time, frequency and sequence) for ACK and NACK transmission of a TB as shown below in Table 3.

TABLE-US-00003 TABLE 3 Feedback Resource Normal Feedback (T1, F1, phase 1) TB0 ACK (T2, F2, phase 2) TB0 NACK (T3, F3, phase 3) TB1 ACK (T4, F4, phase 4) TB1 NACK The Sidelink Rx may use these resources in a composite manner to provide the multiplexed feedback for the example of two TBs, as shown below in Table 4.

TABLE-US-00004 TABLE 4 Feedback Resource Multiplexed Feedback (T1, F1, phase 1) TB0 ACK and TB1 ACK (T2, F2, phase 2) TB0 ACK and TB1 NACK (T3, F3, phase 3) TB0 NACK and TB1 ACK (T4, F4, phase 4) TB0 NACK and TB1 NACK Table 4 provides multiplexed feedback mechanisms between a given pair of sidelink Tx and Rx, when the Rx provides feedback for more than one TB in a single feedback interval. This technique can be applied to the case of more than two TBs. The first entry in Tables 3 and 4 may define the lowest frequency, nearest OFDM symbol and the smallest phase. Changes between the frequency, phase and OFDM symbol of one row and the next may also be defined. These principles then enable both the sidelink Tx and the sidelink Rx to have a common interpretation of the signal received.

In general, when the feedback resources are not sufficient, i.e. all the sub-channels cannot be accommodated in the configured PSFCH resource, this will show up in the generalized mapping when the allocated phase shift (cyclically shifted sequence) exceeds the maximum number of phase shifts (sequences). One option may be to perform modulo operation on the maximum number of sequences. Thus, when all the sequences have been exhausted, the same sequences will be re-assigned to some of the sub-channels. However, this may generate undesirable conflicts.

Alternatively, more than one base sequences may be provided for each resource. The PSFCH resource may then be determined such that first all of the PSFCH time frequency resources are used with the first base sequences.

When all the shifted versions of the first base sequence have been exhausted, the feedback implicit resource assignment starts using the second base sequence and so on. In this case, the multiple base sequences, and their ordering may be part of the PSFCH configuration which is part of the resource pool configuration.

Whilst the above discussion is mainly in the context of unicast transmissions where a single sidelink Rx will send HARQ feedback for a given transmission over a feedback resource, the methods discussed are also applicable to groupcast feedback with NACK only feedback (Option 2 of groupcast feedback).

For a unicast feedback, a single transmission is allocated two phase shifts (frequency domain) or two cyclically shifted CDM sequences in time domain. This is to allow feedback of ACK or NACK with a different phase shift (cyclic shift). In the NACK only feedback of groupcast, only NACK is transmitted. Thus, in an aspect of the disclosure, the sidelink receiver UEs may transmit only the phase shift (sequence) which represents NACK. In some examples, the other sequence can be exploited, however, due to implicit feedback resource determination and not knowing beforehand the resource used for groupcast NACK only feedback, the ACK associated sequence may be left unused.

If the group size becomes very large, all the UEs transmitting a single sequence may cause problems, for example, this may lead to higher interference over the neighbouring phase shifts (sequences). To contain this problem, in an aspect of the disclosure, two sequences in NACK only feedback of groupcast may be used. Thus, out of the two phase shifts (cyclically shifted sequences) which are the result of implicit mapping of shared channel, a subset of UEs will transmit the first phase shift (cyclically shifted sequence) to transmit NACK, and the other subset of UEs can transmit the other phase shift (cyclically shifted sequence) to transmit NACK. In this way, the usage of the sequences may differ from the unicast case where one phase shift conveys ACK and the other conveys NACK to the sidelink Tx. The subsets of UEs using a first phase shift and the subset of the UEs using a second phase shift may be part of the groupcast configuration. The splitting of the UEs in two subsets may be achieved in an implicit manner. For example, UEs with an even reference identity may use one phase shift and UEs with an odd reference identity may use the other phase shift. The reference identity may be one or more of: a UE identity, a UE international mobile subscriber identity (IMSI), a the UE sidelink identity.

If the segregation of UE feedback is desired based upon Tx-Rx distance or signal quality level, e.g. based upon RSRP or RSRQ, a threshold may be pre-configured as part of the groupcast HARQ Option 1 configuration. If a sidelink receiver's estimated quantity (e.g. distance from the sidelink Tx or RSRP) is larger than the threshold, the sidelink receiver may send its NACK on one phase shift (sequence) of the implicitly determined PSFCH resource. In the contrary case of this binary decision, the sidelink receiver may send its NACK on the other phase shift (sequence). In this manner, the sidelink Tx may get an estimate over which distance (or RSRP levels) the transmission is successful.

When a groupcast TB with HARQ feedback option 2 is scheduled, a Rx UE may transmit an ACK if it decodes the corresponding TB, and a NACK otherwise. Receiving at least one NACK or missing at least one feedback (no ACK nor NACK from a given Rx UE) may trigger a retransmission process.

Assuming there are Kg receivers UEs in a group (where Kg is a positive integer), a corresponding groupcast TB requires Kg-1 resources in PSFCH. This raises two issues for implicit PSFCH mapping. Firstly, a groupcast option 2 TB may be scheduled anywhere in the resource pools and this is not known from the UEs out of the group scheduled in the same resource pool. Secondly, PSFCH resource requirements for each groups may depend on group size which is not known from the UEs out of the group.

Therefore, the PSFCH Time-Frequency resource mapping for groupcast option 2 may be independent from the group size while the remaining resource in PSFCH, namely the base sequences and their phase shifts can be used to map the multiple Rx UEs feedbacks. Accordingly, in an aspect of the disclosure PSFCH resources may be split in two resource sets, one resource set for unicast and groupcast option 1 TBs, and one resource set for groupcast option 2 TBs. Alternatively, the first resource set may be dedicated to unicast only and the second one to groupcast option 1 and option 2.

Figure 9:
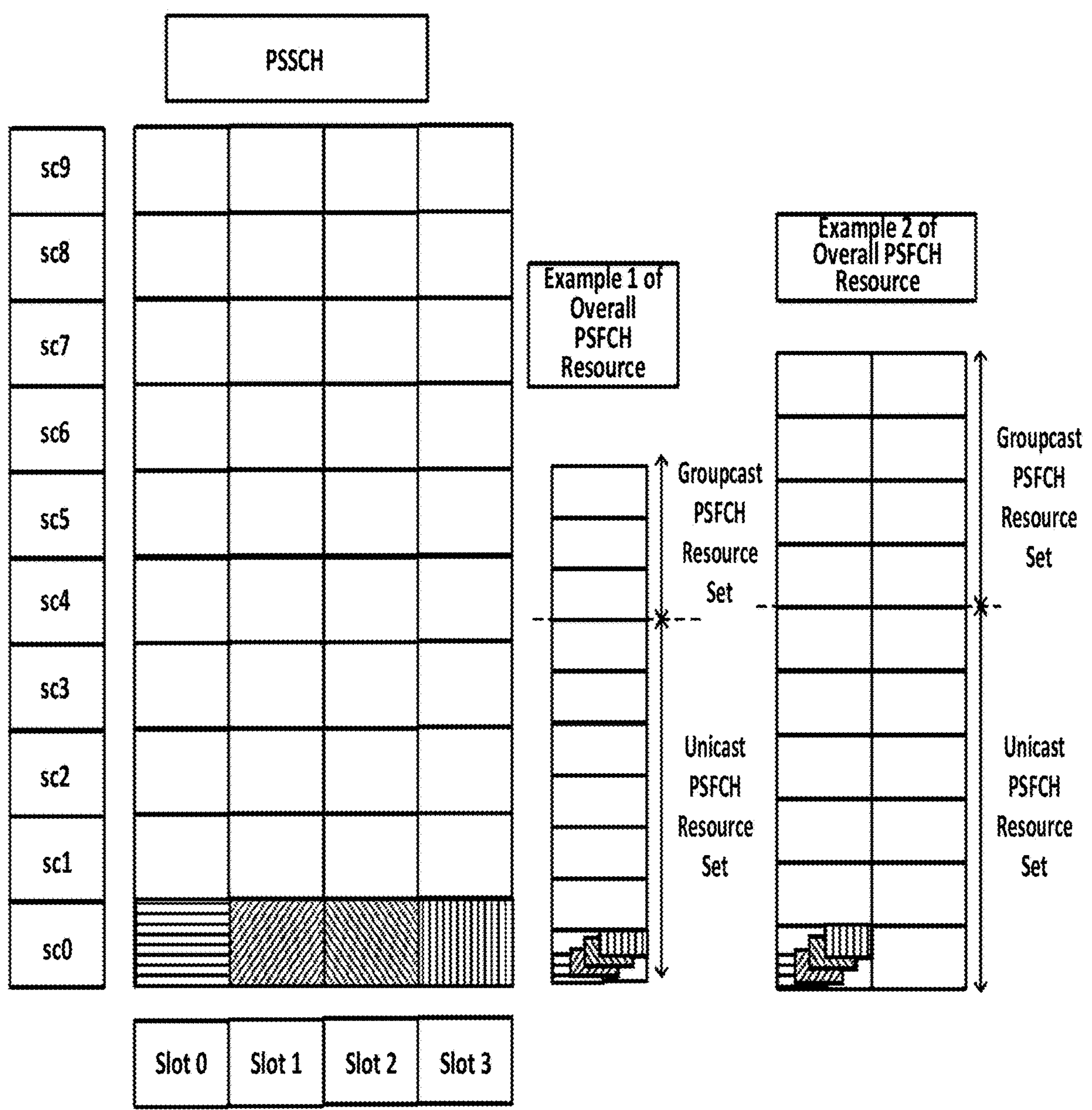
FIG. 9 shows generalized PSSCH to PSFCH mapping with unicast/groupcast split.

FIG. 9 shows generalized PSSCH to PSFCH Mapping with unicast and groupcast split. PSFCH resource sets configuration may be part of the resource pool configuration.

For groupcast HARQ option 2 TBs, implicit feedback resource mapping may be applied within the corresponding dedicated PSFCH resource set. Groupcast TB may be scheduled anywhere in the PSSCH resource, but feedback is constrained within the PSFCH groupcast resource set. This can be achieved by having an offset provided for the groupcast feedback determination as part of the resource pool configuration.

Taking an example with C sub-channels of PSSCH in the PSFCH period, R PSFCH resources per PSFCH groupcast resource set in each occurrence of PSFCH period, and that the maximum value for Keffective=Kmax:

PSFCH T-F resource for PSSCH sub-channel c=c modulo-division R

PSFCH Phase-shift (CDM) sequence for sub-channel c feedback by kth UE of a groupcast=(Kmax−1)+k Here the groupcast feedback capacity is limited by the number of available Phase shifts which are used to differentiate the feedback of different groupcast Rx UEs, moreover the set of Phase shifts is also used to differentiate slots. Accordingly, in an aspect of the disclosure, it is a groupcast PSFCH resource set may be extended in time dimension in order to use longer feedback sequences allowing more Phase shifts and more simultaneous orthogonal feedbacks.

The unused PRBs or subchannels in PSFCH OFDM symbols may not be reused for data traffic. Therefore, if PSFCH groupcast resources are extended in time, PSFCH unicast resource set may be mapped over the same OFDM symbols as PSFCH groupcast resource to maximize spectral efficiency. With such PSFCH structure, the amount of unused resources within the OFDM symbols assigned to PFSCH may be minimized while the PFSCH resources which are unnecessary for unicast can be assigned for groupcast option 2 which require higher feedback capacity.

Figure 10:
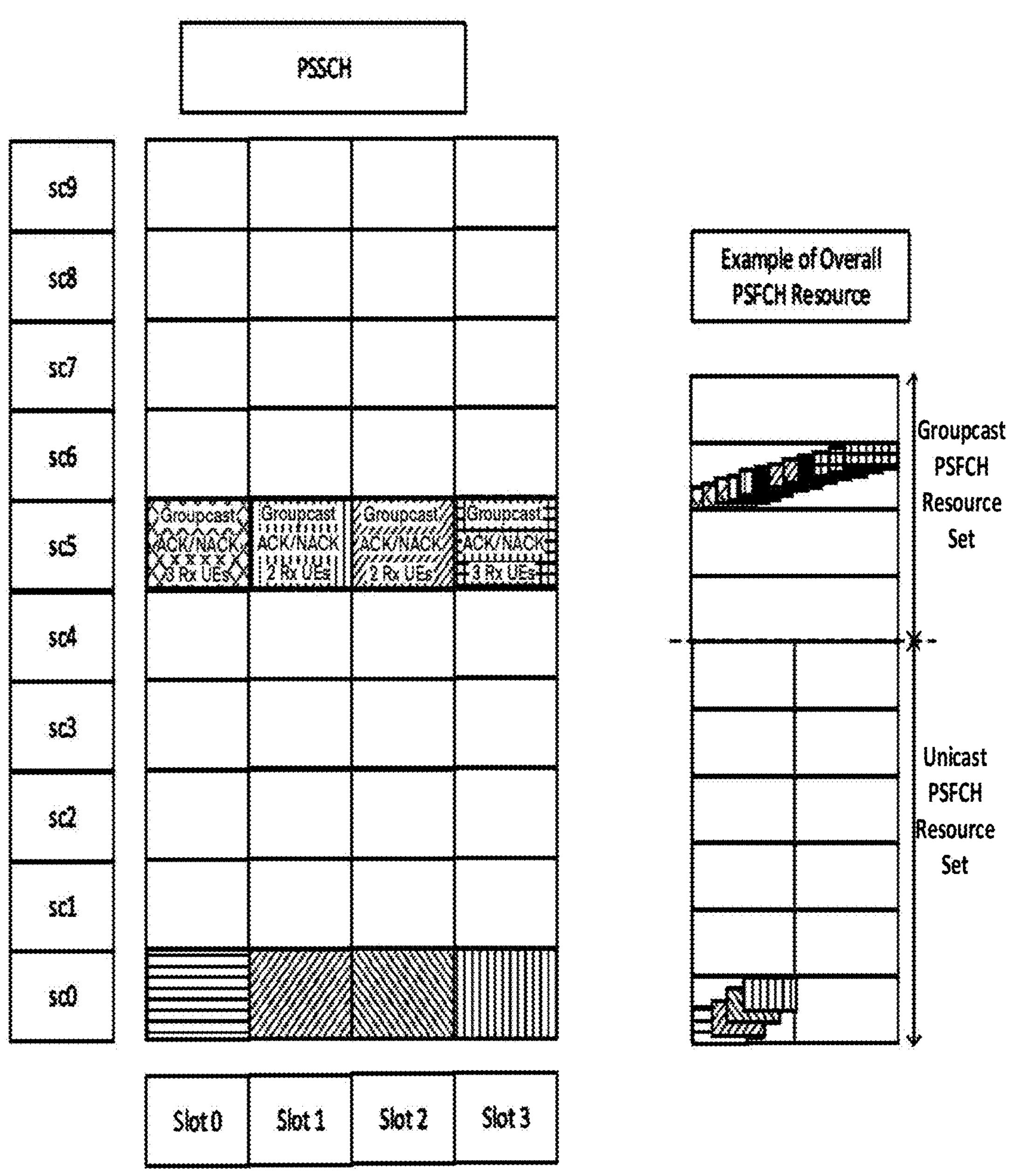
FIG. 10 shows generalized PSSCH to PSFCH mapping with unicast/groupcast split and longer sequence for groupcast FB.
Figure 11:
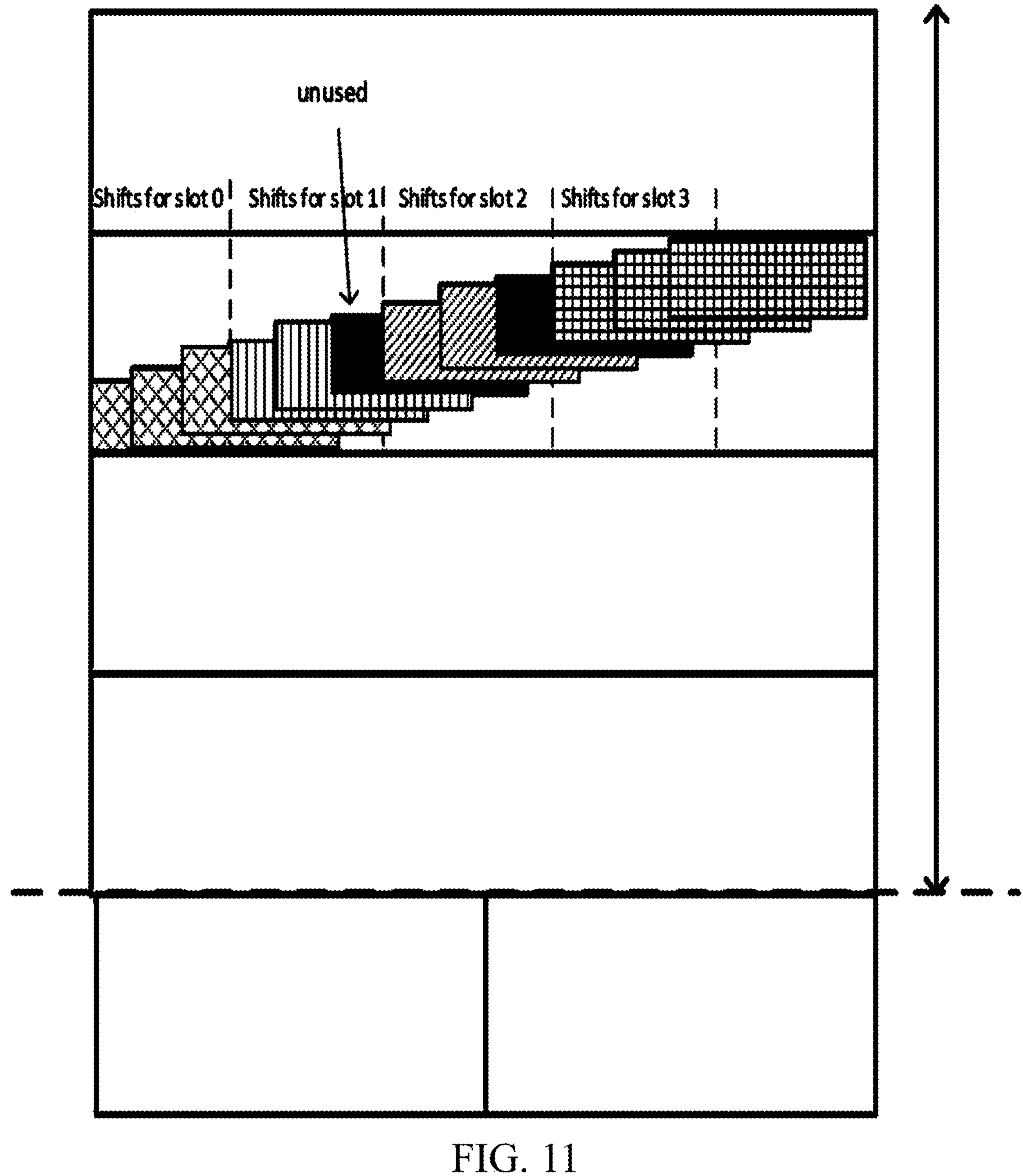
FIG. 11 shows a detailed view of generalized PSSCH to PSFCH Mapping for groupcast of FIG. 10.

FIG. 10 illustrates generalized PSSCH to PSFCH mapping with unicast/groupcast split and longer sequence for groupcast FB. FIG. 11 illustrates a detailed view of generalized PSSCH to PSFCH mapping for groupcast.

Additional feedback capacity may be achieved by using several base sequences for feedback on which to apply phase shifts. This may be obtained by breaking orthogonality between feedbacks.

Taking an example with C sub-channels of PSSCH in the PSFCH period, and R PSFCH resources per PSFCH groupcast resource set in each occurrence of PSFCH period:

PSFCH T-F resource for PSSCH sub-channel c=c modulo-division R

PSFCH base sequence sequence for sub-channel c=cInteger-division R

PSFCH Phase-shift (CDM) sequence for sub-channel c feedback by kth UE of a groupcast=k This scheme effectively assigns first an orthogonal time frequency resource in a groupcast PSFCH resource set to a groupcast transmission over a sub-channel. The next sub-channel, if groupcast, may be mapped to next time-frequency feedback resource. After implicitly mapping 1:1 shared channel sub-channels to the feedback resources, the next sub-channels may start re-using the same time-frequency feedback resources in a cyclic manner but with a different base sequence whose phase shifts convey the information to the transmitter. In this way, the resource determination stays implicit and some protection is provided through different base sequences.

In an aspect of the disclosure, the PSFCH resource for the groupcast ACK-NACK feedback may be partitioned into composite resources. The overall feedback resource may have R composite PSFCH resources. Each composite resource r {0, 1, 2, . . . R−1} may comprises M single PSFCH resources. The determination of PSFCH resource for a groupcast transmission with reference sub-channel c and for a reference user equipment k may be done as in the following:

PSFCH T-F composite resource for PSSCH sub-channel c=c modulo-division R

After having determined a specific composite resource, each user equipment in the group may determine its unitary time-frequency resource in the composite resource and the phase shift to be used. This is done as in the following:

PSFCH time-frequency resource within the composite resource for user k=k modulo-division M PSFCH Phase-shift (CDM) sequence for user k=k integer-division M For groupcast relations, the parameter k has been used for the k.sup.th user. This represents the user equipment identity in the group and may be part of the sidelink group configuration. This parameter may capture the position of the user equipment in the group and may be configured or derived consistently at the sidelink Tx and sidelink Rx(s) so that there is no confusion at the sidelink Tx about the user failing to decode the transmission. This may be helpful as in certain cases sidelink Tx may perform re-transmissions which are particularly suitable for the user failing the previous ones.

As composite resources may not be dimensioned in a 1:1 manner to the sub-channels of the shared channel within a feedback period, multiple base sequences may be introduced when the same composite feedback resource is shared with another sub-channel. This is given by the following:

PSFCH Base Sequence for PSSCH sub-channel c=c integer-division R

In this manner, each new PSSCH sub-channel which is mapped on a composite resource may use a different phase shift sequence and hence avoids brute overlap and high interference.

The above discussion relates to schemes for implicit PSFCH resource determination in which the number of groupcast ACK-NACK transmissions is inherently unknown beforehand.

In an aspect of the disclosure, a group based PSFCH resource determination is provided in which some information on the feedback resource is provided to the group members. This information may be part of the group configuration. An indication may be provided to the group members as to where the feedback resource for the group members starts in the feedback region.

If the feedback resource is configured in the resource pool configuration, an offset may be indicated with respect to the feedback resource start address which provides the location of the group feedback resource.

If a dedicated PSFCH resource region is configured in the resource pool configuration, the offset may be provided with respect to the group feedback start address.

Alternatively, a full address for the groupcast feedback resource may be specified.

For a given resource pool, on average, there may be fewer groupcast transmissions compared to the number of sub-channels in a feedback interval. This means that assigning feedback resource to each active group may be more efficient than dimensioning and making association of all feedback resources. Therefore, when ACK-NACK groupcast transmission is being configured, its feedback address is indicated as part of group configuration. The resource pool configuration may provide how many time-frequency resources a group can use for ACK-NACK based feedback, denoted by M. The base sequence for feedback may be provided in the configuration. Thus, the offset may provide a configured number of PSFCH resources which are assigned to this group for feedback purpose. Within this composite resource comprising of M resources, each UE may implicitly determine its precise time-frequency resource and the phase shift based on:

PSFCH time-frequency resource within the composite resource for user k=k modulo-division M PSFCH Phase-shift (CDM) sequence for user k=k integer-division M The numbered list of possible phase shifts is pre-defined, and k is the user equipment number in the group, which may be the configured user equipment identity in the group or derived in a pre-defined manner. The above relations provide the implicit resource determination for all UEs in the group. An advantage of this scheme is that resources are reserved without any dynamic signalling. Therefore, the sidelink control information may not need to be modified for ACK-NACK based groupcast transmissions.

In an aspect of the disclosure, a group configured with ACK and NACK based feedback for sidelink communication may be provided an indication of the PSFCH resource which the group uses for feedback. This indication may be part of sidelink PSSCH configuration. The precise time-frequency-code resource determination for each user equipment is implicit within the indicated resource.

Figure 12:
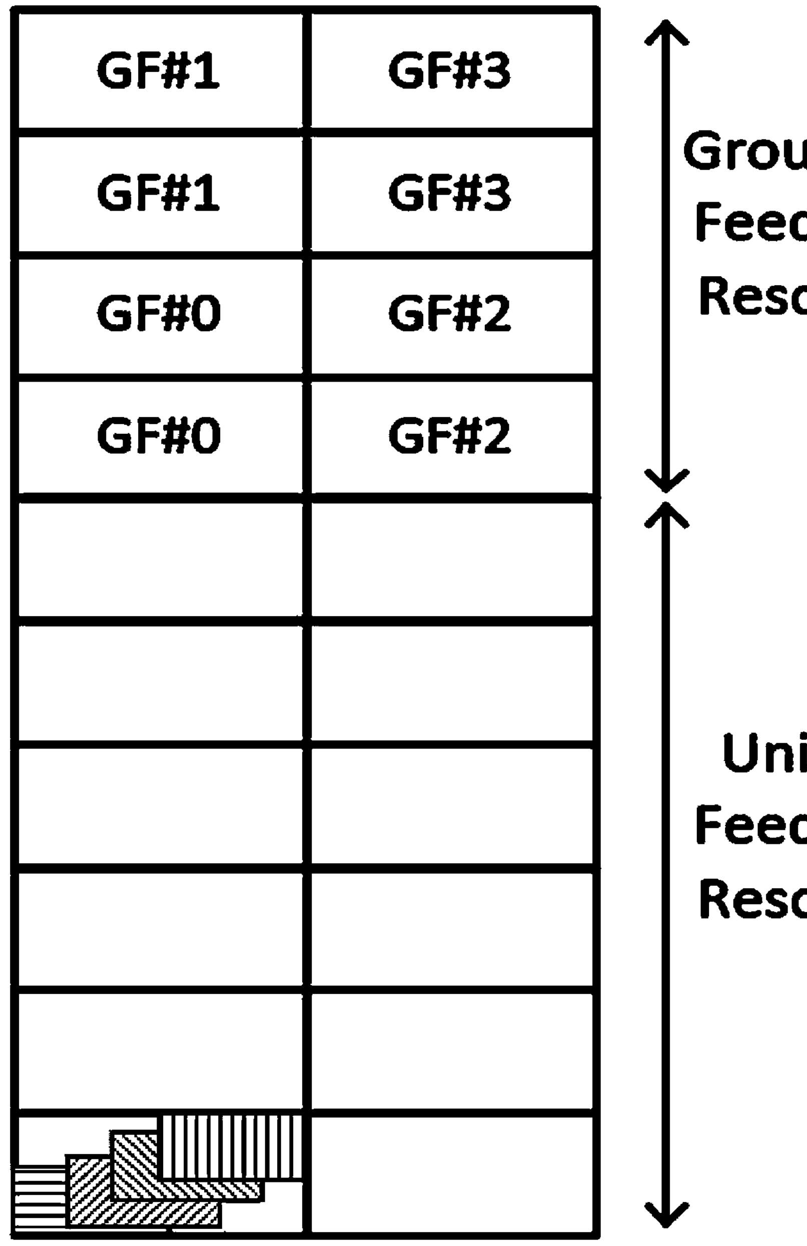
FIG. 12 shows groupcast feedback resource.

FIG. 12 illustrates an example configuration where multiple groupcast resources are shown. When a group becomes active, say Group A, it will be provided an indication (e.g. an offset) to its PSFCH resource. Consider that Group A is provided indication to use Groupcast Feedback (GF) resource #0, GF #0. Resource pool configuration provides that each groupcast composite resource has how many time-frequency resources. In the example of FIG. 12, each groupcast resource has two resources orthogonal in time or frequency or both, i.e., M=2. Then the UEs may perform implicit T-F resource determination and phase shift determination within the indicated group associated configured composite resource.

Alternatively, the periodicity of the groupcast feedback resource may be provided in addition to the resource indication. For example, if resource pool configuration provides the information that the feedback resource repeats every N slots, the group can be configured to use it every 2*N or 3*N, or so on, by using every 2nd, 3rd or further feedback resource occurrence for its feedback. This may be used to accommodate more active ACK-NACK groupcast communications with a given groupcast PSFCH resource.

This approach may be particularly useful in the Mode 1 of sidelink resource allocation where the base station is performing the scheduling for all sidelink transmissions. Where, as part of shared channel configuration, it may provide the indication (offset or address) of feedback resource for a group operating with ACK and NACK based HARQ feedback.

If the scheduling is being performed by a UE on behalf of the network/base-station, the UE may provide this indication to the group.

For Mode 2 communication, where each device is performing self-resource selection based upon sensing, ACK and NACK based feedback approaches may become difficult to manage. Accordingly, in an aspect of the disclosure, sidelink may not support groupcast communication with ACK and NACK based feedback in Mode 2 of resource allocation where each UE is performing its resource selection. For groups configured with ACK and NACK based feedback, if they operate in Mode 2, they may shift from ACK-NACK feedback to NACK only feedback. This may allow them to use the implicit feedback resource determination with unicast and NACK-only-Groupcast groups.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method of determining physical sidelink shared channel (PSSCH) feedback resources performed at a UE, wherein the PSSCH feedback (PSFCH) resource has a periodicity N defined as a number of slots, the method comprising:

counting a number of sub-channels, C, of PSSCH in the period N, wherein each sub-channel, c, is associated with a PSFCH resource;

counting a number of PSFCH resources, R, in the period N;

indexing the sub-channels, c, based on time; and after indexing the sub-channels, c, based on time, indexing the sub-channels, c, based on frequency;

conveying ACK and NACK feedback of a PSSCH shared channel transmission using two cyclically shifted sequences per transmission, wherein the two cyclically shifted sequences include a first phase shift and a second phase shift, and the second phase shift is 180 degrees from the first phase shift, wherein the PSFCH resource associated with each sub-channel is determined based on a lowest numbered sub-channel of the shared channel transmission.

2. The method of claim 1, wherein a PSFCH time-frequency resource for PSSCH sub-channel number c=c modulo-division R.

* * * * *